June 24, 1969  E. H. POVEY  3,452,274
APPARATUS FOR MEASURING LOSS CHARACTERISTICS OF
DIELECTRIC TEST SPECIMENS INCLUDING AN
ELECTRICAL BRIDGE WITH SINE TO SQUARE
WAVE CONVERSION MEANS AND
INTEGRATION MEANS Filed May 4, 1965  Sheet 1 of 2

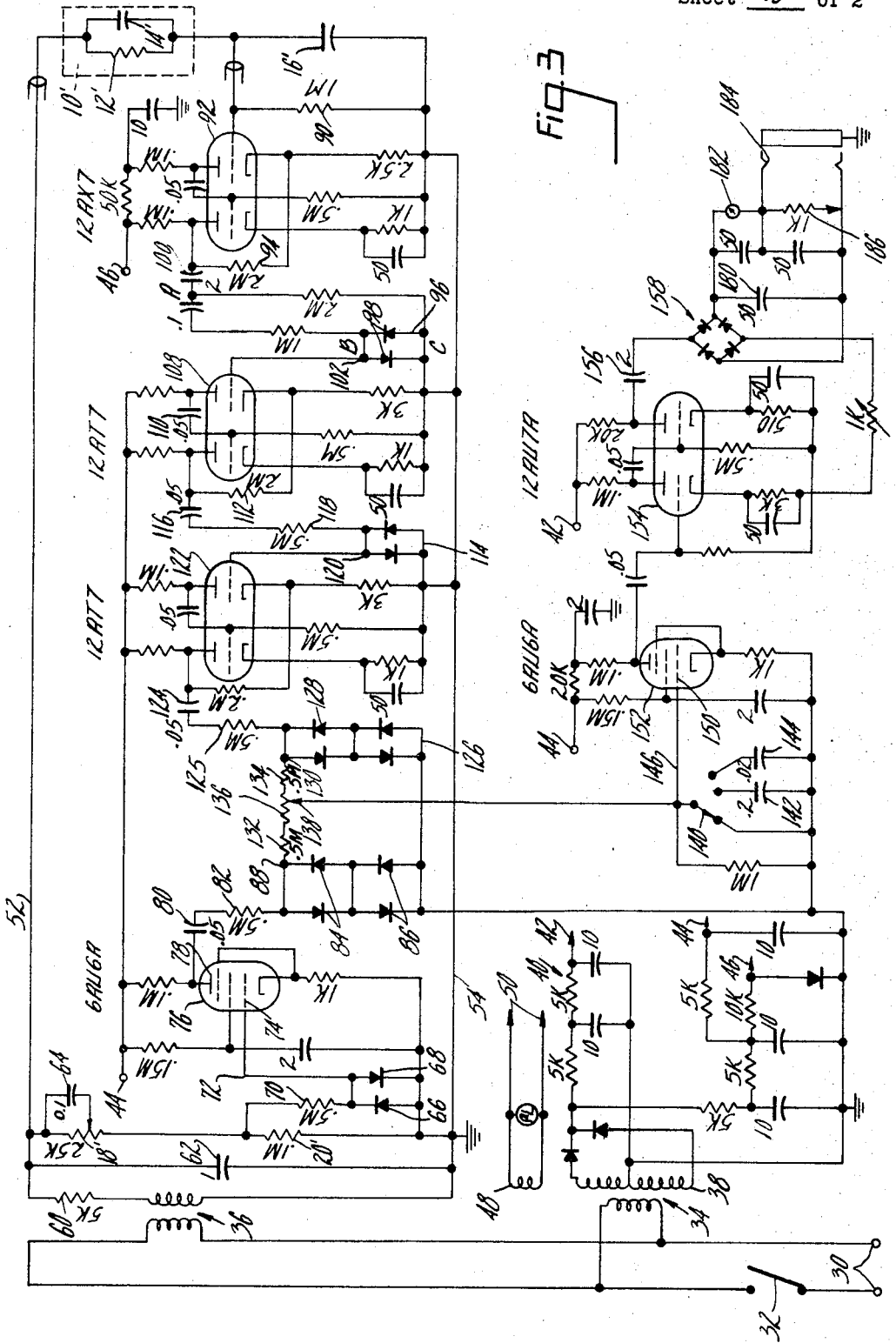

United States Patent Office 3,452,274
Patented June 24, 1969

3,452,274
APPARATUS FOR MEASURING LOSS CHARACTERISTICS OF DIELECTRIC TEST SPECIMENS INCLUDING AN ELECTRICAL BRIDGE WITH SINE TO SQUARE WAVE CONVERSION MEANS AND INTEGRATION MEANS
Edmund H. Povey, Medford, Mass., assignor to Doble Engineering Company, Belmont, Mass., a corporation of Massachusetts
Filed May 4, 1965, Ser. No. 453,145
Int. Cl. G01r 27/26, 25/00; H03k 5/08
U.S. Cl. 324—61                                      10 Claims

ABSTRACT OF THE DISCLOSURE

Apparatus for measuring the dielectric quality of electrical insulating oil includes a test cell for receiving the oil. The test cell includes two electrodes of a capacitor and a high value no loss capacitor is connected in series with the test cell, so that a sinusoidal voltage in quadrature with the current through the test cell is produced. A second sinusoidal voltage is provided across a zero phase angle standard resistor. Both sinusoidal voltages are converted to symmetrical square waves and a difference signal is produced by comparing the two square waves. The difference signal is integrated and applied to a meter to provide a direct indication of the loss characteristics of the oil being tested.

---

This invention relates to apparatus for measuring electrical characteristics and more particularly to apparatus for measuring the electrical loss characteristics of dielectric test specimens.

The dielectric quality of electrical insulating oil, of the type used in oil transformers and circuit breakers, for example, must be maintained at a high level, and therefore it is desirable to test the dielectric characteristic of the oil at regular intervals and/or to evaluate the life of the oil by accelerated oxidation testing. Measurements of oil specimens may be made between two electrodes immersed in the oil in a small test cell. The electrodes form a small capacitor, with the oil providing the dielectric. Frequently a loss characteristic, such as power factor or dissipation factor, provides sufficient information for evaluation of the oil specimen, such as in the measurement of the water content of the oil, see, e.g., Doble Patent 2,807,956. It should be understood, however, that this invention is not limited to that particular application and that its scope includes the measurements of the loss characteristics of the many dielectrics and insulations which are well known in the art.

The objects of this invention include the provision of novel and improved apparatus for measuring the dielectric characteristics of dielectric test speciments.

Another object of the invention is to simplify and facilitate the measurement of loss characteristics of dielectric test specimens.

A further object of the invention is to provide novel and improved apparatus for analyzing the quality of electrical insulating oil.

The apparatus constructed in accordance with the invention for measuring the loss characteristics of a dielectric, includes a source of alternating voltage that is connected to charge a dielectric test specimen disposed between two electrodes of a capacitor of a test cell. A no loss capacitor of high value relative to that of the test cell may be connected in series with the test cell to establish a first sinusoidal output voltage in quadrature with the current through the test cell. A clipping circuit acts on the first output voltage to convert the sinusoidal voltage wave into an alternating voltage square wave of predetermined magnitude. There is also coupled to the source of alternating voltage, a zero-phase-angle standard resistor in parallel with said test cell and the capacitor. A second sinusoidal output voltage is derived across the resistor, in phase with the current through the resistor. There is also provided a second clipping circuit which acts on the second output voltage to convert that voltage to a second alternating voltage square-wave of the same magnitude. A comparing circuit senses the first and second square-wave voltages and produces a difference signal, directly related to the phase difference between said first and second square-wave voltages. An integrating circuit is coupled to said comparing circuit, and the output of the integrating circuit provides an indication of the phase difference between the current through the test cell and the current through the resistor, thereby providing a direct measurement of the loss characteristics of the dielectric in said test cell.

In the embodiments described hereinafter in greater detail, the comparing circuit includes a resistor element, and the difference signal is extracted from the center of the resistor element. One of the square-wave voltages is applied to one end of the resistor element and the other square-wave voltage is applied to the other end of the resistor element. To provide compensation for minor differences in the amplitude of the two square-wave voltages, it is desirable to include, in series between the comparing circuit and the integrating circuit, a pair of diodes connected in parallel, opposed orientation. Each of these diodes requires the application of a small but definite voltage in the forward direction before it will conduct, and therefore, this compensating circuit removes from the difference voltage, an error component due to small differentials between the magnitudes of the square-wave voltages applied to the comparing circuit.

The clipping circuits may also employ a pair of diodes, similarly connected, in parallel opposed orientation, but in this case, the diode circuit is in parallel with the main signal path, and thus only that small voltage component that exists prior to the diode being placed in its forward conduction condition, is passed along the main signal path. With such clipping circuits, a compensating circuit in this case of a resistive capacitive network may be connected to the input of the clipping circuit. The compensation circuit is adjusted to have the same impedance characteristic as each diode in the clipping circuit when that diode is in forward conduction condition.

Other objects, features, and advantages of the invention will be seen as the following description of particular embodiments thereof progresses, in conjunction with the drawings in which:

FIGURE 3 is a schematic diagram of circuitry constructed in accordance with the invention for measuring characteristics of dielectric test specimens;

Figure 1:
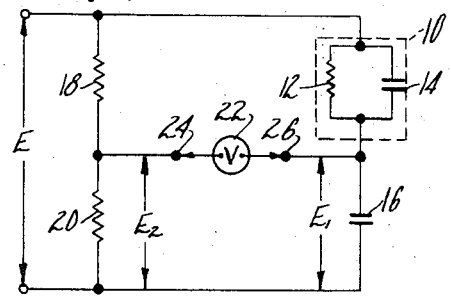
FIGURE 1 is a schematic diagram of test apparatus for measuring characteristics of a dielectric test specimen.
Figure 2:
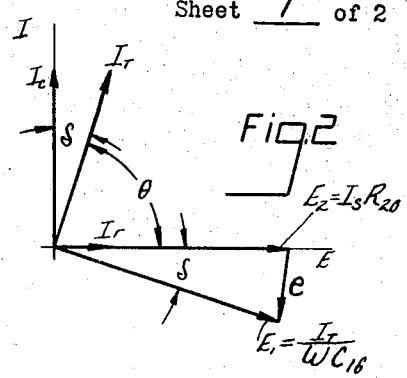
FIGURE 2 is a vector diagram of electrical relationships that exist in the circuitry shown in FIGURE 1.

With reference to FIGURE 1, dielectric test specimen 10 can be represented by a resistor 12 in parallel with a no loss capacitor 14, the resistor 12 accounting for the loss in the dielectric, and the capacitor 14 being the capactive value of the test specimen. This dielectric test specimen may be connected in series with a reference capacitor 16 across a voltage source E to provide a first low voltage $E_1$. A second, or reference voltage $E_2$, may be derived from a resistor voltage dividing network of resistors 18 and 20 also connected across source E. The vector diagram shown in FIGURE 2 indicates the current $I_t$ through the test specimen 10 consists of components $I_r$ and $I_c$. The current $I_r$ is in phase with the applied voltage E, while the current $I_c$ leads the applied voltage E by 90 degrees. The resulting current $I_t$ through the specimen leads the applied voltage E by the phase angle $\theta$ of the dielectric. The loss characteristic of the dielectric may be designated by its power factor (cosine $\theta$) or by the sine of the defect angle $\delta$ as indicated in FIGURE 2. The loss characteristic may be also designated as the dissipation factor—the cotangent of angle $\theta$ or tangent of the defect angle $\delta$.

The arrangement shown in FIGURE 1 indicates a method for measuring the loss characteristic in terms of the defect angle $\delta$. This circuit applies the voltage E across the network of the test specimen 10 and the no loss capacitor 16, to provide a first voltage $E_1$ and across the network of resistors 18 and 20 to provide the second voltage $E_2$.

The voltage $E_1$ is equal to current $I_t$ through capacitor 16 divided by $\omega C$ where $\omega$ equal $2\pi$ times the frequency of the applied signal and C is the value of capacitor 16. This voltage lags $I_t$ by 90°. Similarly, the voltage $E_2$ equals the current $I_s$ through the resistor network times the value of resistor 20 and is in phase with that current. The phase angle between voltages $E_1$ and $E_2$ is the defect angle $\delta$ and the difference between voltages $E_1$ and $E_2$ is $e$ volts. With voltages $E_1$ and $E_2$ equal, by geometry, $e/2 = E_1 \sin \delta/2$.

For small defect angles (up to about ten degrees) 2 sin $\delta/2$ is approximately equal to sin $\delta$, and sin $\delta = e/E_1$. Hence the defect angle or percent power factor may be read directly by a voltmeter 22 connected between terminals 24 and 26.

However, the condition necessary for this analysis is that voltages $E_1$ and $E_2$ are equal, and those voltages must be continually checked and adjusted as necessary to maintain the equality. Constant checking is particularly necessary in the measurement of the water content of oil as large changes occur in the capacitance of the test cell. Further, the voltmeter 22 is at a relatively high potential which provides disadvantages, both from the standpoint of safety and from the standpoint of simplifying the operation of an amplifier, if such is used in connection with either voltage $E_1$ or $E_2$.

As indicated above, the defect angle is a measurement of the difference in phase between the voltages $E_1$ and $E_2$. The instant invention provides a circuit for measuring this phase difference, without the necessity of maintaining equality between the voltages of $E_1$ and $E_2$. FIGURE 3 shows a preferred embodiment of the invention, which includes terminals 30 to which a suitable energy supply is connected. Switch 32 controls the application of power to transformers 34 and 36. Transformer 34 has a 300 volt center tapped secondary winding 38, the center tap of which is grounded. A full wave rectifier circuit with smoothing filter circuits 40 provides rectified DC voltages at terminals 42, 44 and 46. Transformer 34 has another secondary winding 48 which supplies heater voltages at terminals 50 to the vacuum tubes.

The secondary winding of isolating transformer 36 (one-one ratio) produces between lines 52 and 54, an alternating signal corresponding to the voltage E indicated in FIGURE 1.

Resistor 60 and capacitor 62 function as a simple filter to substantially eliminate harmonics in the supply voltage and those introduced by transformers 34 and 36. The test specimen 10' and a capacitor 16' are between lines 52 and 54. Also connected across the lines 52 and 54 are a standard zero phase angle resistor 20' in series with an adjustable resistor 18'. (Capacitor 64 provides phase adjustment if necessary.)

A clipping circuit of two diodes 66 and 68, connected in opposed parallel arrangement, is connected in series with resistor 70 to the junction between resistors 18' and 20'. Because of the relatively high applied voltage, the clipping action of these diodes produces a truncated but nearly square AC voltage wave at point 72. In order to improve the shape of this voltage wave, it is applied to the control grid 74 of linear pentode amplifier 76, which amplifies the voltage wave and imparts a 180 degree phase reversal to the voltage wave. The plate 78 of pentode 76 is coupled by means of capacitor 80 and resistor 82 to a double clipping circuit consisting of two pairs of diodes 84, 86 in series. The output of the clipping circuit at point 88 is an essentially square wave voltage that is 180 degrees out of phase with the input voltage appearing at point 72.

The current through test cell 10' is coupled to ground through a no loss capacitor 16', the capacitance of which is selected to produce a voltage across its terminals that is small compared to the voltage across the test cell, a typical value being in the order of 0.5 volt. A capacitor of 0.25 microfarad capacitance is well adapted for use with a typical oil test cell. A high resistance grid leak resistor 90 is connected in parallel with capacitor 16'. The voltage across capacitor 16' is so small that it frequently requires considerable amplification prior to clipping. For this purpose, two stages of amplification are provided by the twin triode 92, the plate circuit of the right triode section being capacitively coupled to the grid of the left triode section. A resistor 94 provides a negative feed back connection between the plate of the left section and the cathode of the right section triode to improve the linearity and to reduce the phase shift of the amplification stages.

A clipping circuit 96, including two parallel, opposed diodes 98, is also coupled to the plate circuit of the second triode stage via capacitor 100 so that at point 102 there appears a substantially square wave voltage that is in phase with the signal applied to the first triode stage. This square wave is amplified by the second dual triode 108 that is connected in the manner similar to tube 92, the capacitor 110 coupling the output of the first amplification stage to the input of the second amplification stage. A similar feed back resistor 112 is connected between the output of the second triode stage and the cathode of the first triode stage. A second dual diode clipping circuit 114, connected to the output of the tube 108 by capacitor 116 and resistor 118, provides an improved square wave output voltage at point 120 that is in phase with the signal applied to the input of tube 92. A third dual stage of amplification is provided by tube 122 connected in the same manner as tubes 92 and 108, and its output is connected by means of capacitor 124 and resistor 125 to series clipping circuits 126 and 128. The output of these clipping circuits (at point 130) is substantially a square wave in phase with the input signal applied to tube 92.

It will be observed that with reference to FIGURE 1, the signals at the points 88 and 130 correspond to the signals at points 24 and 26 with a 180 degree phase shift having been imparted to the signal at point 88. The amplitude characteristic of these signals has been removed, but the exact phase characteristics remain.

Connected between points 88 and 130 is an integration circuit that includes a resistor element having two main sections 132 and 134 and a finely divided center section 136, with which a slidable contactor 138 makes contact. Contactor 138 is connected via switch 140 directly to ground or through capacitor 142 or 144 to ground for controlling the amplitude of the signal on line 146 applied to the grid 150 of tube 152.

Figure 4:
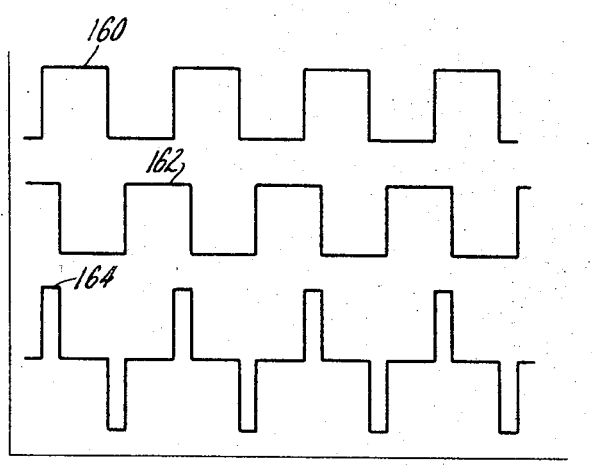
FIGURE 4 is a graph indicating the operation of a circuitry shown in FIGURE 3.

Referring to FIGURE 4, the graph 160 represents a typical signal appearing at point 88 in FIGURE 3; graph 162 is a typical signal appearing at point 130; and graph 164 represents the difference signal between these two points which appears at the slidable contactor 138. Graph 160 corresponds to the phase of voltage $E_2$, FIGURE 1, with a 180° phase shift; graph 162 corresponds to the phase of voltage $E_1$; and graph 164, a series of rectangular pulses, is the difference voltage which would normally appear at contactor 138. However, owing to the effect of either capacitor 142 or 144, graph 164 becomes an integrated wave and appears as such at point 146.

During most of each half cycle when the signals at points 88 and 130 are equal and of opposite polarity, there is no net voltage acting on the integration circuit. However, due to small differences in characteristics of the diodes in the clipping circuits, the magnitudes of the square-wave voltages at points 88 and 130 may be somewhat unequal. These two magnitudes may be brought into equality with respect to the integrating circuit by the adjustment of contactor 138 relative to the finely divided resistor 136. Such an adjustment may be readily made by means of a cathode ray oscilloscope.

For a fraction of each half-cycle, depending on the defect angle of the test specimen, the signals at points 88 and 130 are of the same polarity, and together create the pulse which charges capacitors 142 and 144, as selected by switch 140. The signal on line 146 will depend on the amount of charge furnished to the capacitor, which in turn is related to the duration of the pulse, which in turn is related to the defect angle of the test specimen.

With reference again to FIGURE 3, the signal on line 146 is applied to the control grid 150 of a pentode amplifier 152, the output of which is capacitively coupled to two further stages of amplification provided by dual triode 154. The output from the third stage of amplification is coupled by capacitor 156 to a full wave rectifier 158 (diode bridge type). A capacitor 180 is connected across the output terminals of the rectifier to smooth the ripple in the rectified current wave, and that current is measured by a DC indicating instrument 182, the scale which may be calibrated in either power factor or dissipation factor or in parts of water in oil. In certain applications, such as measuring the parts of water in oil specimens, it is often desirable to obtain time records. This may be accomplished by connecting a recorder to the rectifier output circuit receptacle 184. When the recorder is plugged in, resistor 186 is open circuited so that the resistance of the rectifier output circuit remains unchanged.

In order to establish the correct phase relation between the currents through the standard resistor 20′ and the test specimen 10′, an adjustable phase shifting network consisting of a capacitor 64 connected between one end of resistor 18′ and an adjustable slider thereon is provided, as indicated above. This adjustment may be accomplished by substituting a no loss capacitance for the test cell 10′ and adjusting the slider on resistor 18′ until the indication of the meter 182 is zero.

Figure 6:
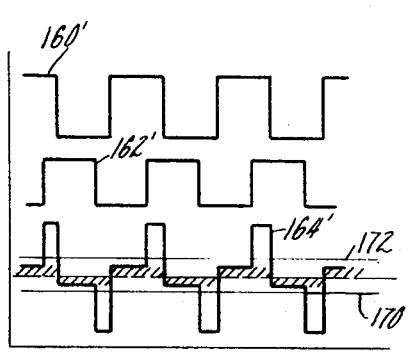
FIGURE 6 is a second graph indicating a type of operation of the circuitry shown in FIGURE 5.
Figure 5:
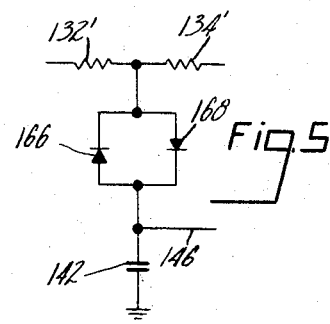
FIGURE 5 is a schematic diagram of a modified circuit configuration.

A circuit modification which is particularly useful in connection with the measurements of low power factors (small phase differences), is shown in FIGURE 5, and the effect of this circuit is indicated in FIGURE 6. When the magnitudes of the voltages at points 88 and 130 are unequal, an error is introduced by the presence of the offset voltage, as indicated by the shaded portion in FIGURE 6. If the area of the difference pulse above the shaded portion is small with respect to the area of the shaded portion between adjacent pulses, a substantial error may be introduced in the measurement. This error is practically eliminated by the circuit arrangement shown in FIGURE 5, which includes the resistors 132′ and 134′. The finely divided center section 136 is not now necessary, and therefore may be omitted. Two parallel opposed clipping diodes 166 and 168 are connected between the junction of resistors 132′ and 134′ and line 146. Each diode has a critical forward voltage as indicated by lines 170, 172 respectively in FIGURE 6. The magnitudes of the pulses above these levels are equal, and only those portions (in excess of the forward conducting characteristic of the diodes 166 and 168) are applied to line 146. Therefore the meter 182 displays an accurate indication of the dissipation factor.

It may also be noted that the voltage appearing at point 130 is independent of the capacitance of the test speciment 10′. For example, an increase in that capacitance increases the current through capacitor 16′ and the voltage amplified by tube 92 correspondingly increases. The clipping circuits, however, remove the effect of the variation in amplitude, and therefore the signal applied at point 130 is independent of the capacitance of the test specimen. It has been found that the phase effect of the clipping circuits may be improved by making the impedance characteristic between points A and B (FIG. 3) equal to the impedance between points B and C. Thus the output voltage at point 102 (point B) remains in phase with the voltage from the output of the amplifier (point A), regardless of the substantial changes in the magnitude of the output voltage, and in the capacitance of the test specimen. This latter circuit consideration is highly advantageous when the apparatus is used with a water meter, since the capacitance of the sorptive material may vary by a substantial amount as it absorbs more and more water.

Figure 7:
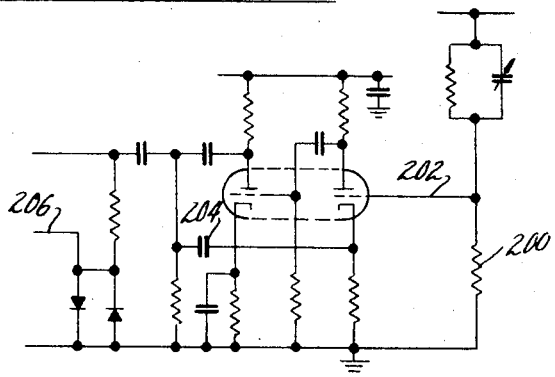
FIGURE 7 is a schematic diagram of a portion of the circuitry shown in FIGURE 3, indicating a modified form thereof.

In certain applications of the invention, it may be desirable to connect resistance rather than capacitance in series with the test specimen 10′. A circuit configuration of this type is indicated in FIGURE 7. In that figure, the capacitor 16′ has been replaced by a resistor 200 which causes the voltage appearing at point 202 to be shifted 90 degrees from its phase value in the arrangement shown in FIGURE 3. Compensation for this phase displacement may be obtained by inserting capacitor 204 in the feedback circuit between the output of the second amplifier stage and the cathode of the first amplifier stage (in place of resistor 94). In this arrangement, the voltage at point 206 is then the same as the voltage at point 102 in the circuit in FIGURE 3.

Thus it will be seen that the invention provides apparatus for measuring characteristics of dielectric test specimens and particularly the evaluation of insulating oil for the use of electrical apparatus in an accurate manner, which requires a minimum of compensating adjustments.

What is claimed is:
1. Apparatus for measuring the loss characteristics of a dielectric test specimen, comprising a test cell having two spaced electrodes for receiving said test specimen therebetween,
   a source of alternating voltage connected to charge said dielectric test specimen disposed between said electrodes of said test cell,
   an impedance of low value relative to that of said test specimen connected between one end of said source and one of said electrodes to establish a first sinusoidal output voltage at a junction between said cell and said impedance in accurate phase relation to the current through said test cell,
   a first clipping circuit connected to convert said first sinusoidal voltage wave into a first symmetrical alternating square wave,
   a zero-phase angle standard resistor connected in parallel with said test cell and said impedance for producing a second sinusoidal output voltage across a portion of said resistor in phase with the current through said resistor,
   a second clipping circuit connected to convert said second output voltage to a second symmetrical alternating square wave,
   a comparing circuit connected to sense said first and second square-waves and produce a difference signal directly related in phase to said first and second square-waves, and
   an integrating circuit coupled to said comparing circuit to provide an indication of the phase difference between the current through said test cell and the current through said resistor, thereby providing a direct measurement of the loss characteristics of said dielectric test specimen in said test cell.

2. The apparatus as claimed in claim 1 further including a pair of reverse connected diodes connected in series between said comparing circuit and said integrating circuit, the magnitude of the voltage required for forward conduction of said diodes being greater than the difference in magnitude between said first and second square waves and less than the magnitude of either of said square waves.

3. The apparatus as claimed in claim 1 wherein each of said clipping circuits includes a pair of reverse connected diodes.

4. The apparatus as claimed in claim 3 further including an impedance connected in series with said pair of diodes that has a phase angle characteristic equal to the phase angle characteristic of each said diode of the pair when the diode is in forward conducting state.

5. Apparatus for measuring the loss characteristic of a dielectric specimen comprising a source of alternating voltage connected for charging said specimen,
 a no-loss capacitor of relatively high capacitance coupled between said specimen and ground to establish a first sinusoidal voltage in quadrature with the current flow through said specimen produced by said source,
 first clipping means coupled to said capacitor for converting said first sinusoidal voltage into a first symmetrical alternating voltage square wave,
 a zero-phase angle standard resistor coupled across said source of alternating voltage to establish a second sinusoidal voltage across said resistor in phase with the current flow through said resistor,
 second clipping means coupled to said standard resistor for converting said second sinusoidal voltage into a second symmetrical alternating voltage square wave,
 resistive means to compare said first and said second square waves and produce a phase difference signal,
 means to amplify said phase difference signal,
 means to convert said phase difference signal into a unidirectional current, and
 means to measure said unidirectional current to provide an indication of the angle of phase difference between said first and second square waves, thereby providing a direct measurement of the loss characteristics of said dielectric specimen.

6. Apparatus for measuring the loss characteristics of a dielectric comprising:
 an alternating current power supply,
 transforming means coupled to said power supply to produce a source of alternating voltage to charge said dielectric and to isolate said apparatus from said power supply, filter means for removing harmonics from said power supply,
 a no-loss capacitor of relatively low reactance coupled between said dielectric and ground to produce a low voltage in phase quadrature with the current through said dielectric,
 first linear zero-phase-angle amplifying means coupled to said no-loss capacitor for producing a first increasement in the sinusoidal voltage wave appearing at said capacitor, first clipping means coupled to the output of said first amplifying means for producing a first approximate square wave, said first increasement exceeding the cut-off voltage of said first clipping means,
 second linear zero-phase-angle amplifying means for producing an increasement in said first approximate square wave to produce an increased approximate square wave,
 second clipping means coupled to said second amplifying means to produce a first symmetrical square wave,
 a standard zero-phase-angle resistor coupled to said source of alternating voltage to produce a current through said resistor which is in phase with said source of alternating voltage,
 third clipping means coupled between said standard resistor and ground to produce a second approximate square wave,
 third zero-phase-angle amplifying means coupled across said third clipping means for producing an increasement in said second approximate square wave and reversing the phase of said second approximate square wave,
 fourth clipping means coupled to said third amplifying means for producing a second symmetrical square wave,
 resistive means coupled between said second clipping means and said fourth clipping means to compare said first and said second symmetrical square waves,
 slideable contactor coupled to said resistive means adjacent its central point,
 integrating means coupled between said slideable contactor and ground,
 fourth amplifying means connected to said integrating means to produce an increasement in the output of said integrating means,
 rectifying means coupled to the output of said fourth amplifying means to convert the output signal from said fourth amplifying means into a unidirectional current,
 smoothing means coupled to said rectifying means,
 measuring means responsive to the integrated value of said unidirectional current to indicate the phase angle between said first and said second square waves, thereby providing a direct measurement of the loss characteristics of said dielectric specimen, and
 phase-shifting means to produce a relative phase difference between the current through said dielectric and said current through said standard resistor.

7. Apparatus for measuring the loss characteristics of a dielectric, comprising:
 an alternating current power supply,
 transforming means coupled to said power supply for producing a source of alternating voltage to charge said dielectric, and for isolating said apparatus for said power supply,
 filtering means for removing harmonics from said alternating current power supply,
 a no-loss capacitor connected in series with said dielectric to establish a low sinusoidal voltage in phase quadrature with the current through said dielectric,
 a first linear zero-phase-angle amplifying means coupled to said capacitor for producing an increasement in said low sinusoidal voltage, a first clipping means coupled to the output of said amplifying means,
 said first clipping means producing a first approximate square wave from said low sinusoidal voltage,
 second linear zero-phase-angle amplifying means coupled to said first clipping means for producing an increasement in said approximate alternating square wave,
 second clipping means coupled to said second amplifying means for producing a first symmetrical square wave,
 a zero-phase-angle resistor and series-connected third clipping means coupled between said source of alternating voltage and ground for producing a second approximate square wave,
 third linear zero-phase-angle amplifying means for producing an increasement in said second approximate square wave produced by said third clipping means, and a reversal of said second approximate square wave,
 fourth clipping means coupled to said third amplifying means for producing a second symmetrical alternating voltage wave,
 resistive means coupled between said second and said fourth clipping means to produce a composite difference wave of said first and said second square waves, contact means coupled adjacent the midpoint of said resistive means, integrating means coupled to said contact means, fifth clipping means coupled between said contact means and said integrating means to cut off the lower portions of said difference wave, fourth amplifying means coupled between said fifth clipping means and ground for producing an increasement in the resultant upper portions of said difference wave, rectifying means coupled to said fourth amplifying means to produce a unidirectional current representative of the phase-angle between said current through said dielectric and the current through said zero-phase-angle resistor, measuring means coupled to said rectifying means responsive to said unidirectional current, to indicate the loss characteristic of said dielectric, and phase-shifting means capable of producing a phase difference between the current in said dielectric and the current through said zero-phase-angle resistor.

8. The apparatus as claimed in claim 7 wherein each of said clipping means includes a pair of reverse connected diodes.

9. The apparatus as claimed in claim 8 further including an impedance connected in series with said pair of diodes that has a phase angle characteristic equal to the phase angle characteristic of each said diode of the pair when the diode is in forward conducting state.

10. Apparatus for measuring directly the loss characteristics of a specimen of electrical insulating oil comprising a test cell having two spaced plates arranged to receive said specimen, means for connecting a source of alternating voltage to said test cell, means connected to said test cell for establishing a first square voltage wave representing in phase the current through said specimen but having a constant magnitude, including an impedance coupled in series with said test cell to produce at the junction between said impedance and said cell a low sinusoidal voltage representative of the current through said test cell, amplifying means to increase the magnitude of said low sinusoidal voltage to an amplified sinusoidal voltage at the output terminals of said amplifying means, and clipping means coupled to said output terminals comprising a first pair of semi-conducting diodes across which is developed the first square voltage wave as determined by the forward conductive characteristic of said first pair of diodes, means for establishing a second square voltage wave equivalent in phase and magnitude to the first square voltage wave when the dielectric specimen in said test cell is loss free, including an impedance and a second pair of semi-conducting diodes connected in series across said source of alternating voltage to produce across said diode pair a second square voltage wave as determined by the forward conductive characteristics of said second pair of diodes, means for obtaining a difference voltage wave representative of the difference between said first and said second square voltage waves, and means for producing a unidirectional current proportional to said difference voltage wave as integrated to indicate the loss characteristics of said insulating oil.

References Cited

UNITED STATES PATENTS

| | | | |
|---|---|---|---|
| 2,497,693 | 2/1950 | Shea | 328—171 XR |
| 2,781,489 | 2/1957 | Petrides | 324—87 |
| 2,902,650 | 9/1959 | Kaiser | 324—83 XR |
| 2,806,175 | 9/1957 | Hansen. | |
| 3,026,474 | 3/1962 | Pihl | 324—60 |
| 3,183,446 | 5/1965 | Richman | 324—140 XR |

RUDOLPH V. ROLINEC, *Primary Examiner.*

E. E. KUBASIEWICZ, *Assistant Examiner.*

U.S. Cl. X.R.

307—237; 324—87; 328—171